United States Patent
Dear

[15] 3,695,498
[45] Oct. 3, 1972

[54] NON-CONTACT THERMAL CUTTING
[72] Inventor: Terrence A. Dear, Newark, Del.
[73] Assignee: PPG Industries, Inc., Pittsburgh, Pa.
[22] Filed: Aug. 26, 1970
[21] Appl. No.: 66,941

Related U.S. Application Data
[63] Continuation-in-part of Ser. No. 708,952, Feb. 28, 1968, abandoned.

[52] U.S. Cl. .....................225/1, 219/347, 225/93.5
[51] Int. Cl. ................................................B26f 3/14
[58] Field of Search........................225/1–5, 93.5; 65/97, 112; 219/347–349, 121 L

[56] References Cited

UNITED STATES PATENTS

| | | |
|---|---|---|
| 1,720,883 | 7/1929 | Campbell et al..........225/93.5 |
| 1,777,644 | 10/1930 | Hitner .....................225/93.5 |
| 1,973,546 | 9/1934 | Spinasse .......................65/97 |
| 3,453,097 | 7/1969 | Häfner........................65/112 |
| 3,242,314 | 3/1966 | Eckles ..................219/343 X |
| 3,374,531 | 3/1968 | Bruce .........................219/347 |
| 3,578,936 | 5/1971 | Gerber .......................219/347 |

FOREIGN PATENTS OR APPLICATIONS

| | | | |
|---|---|---|---|
| 752,400 | 6/1953 | Germany...................219/349 |
| 938,499 | 2/1956 | Germany...................219/349 |
| 1,244,346 | 7/1967 | Germany...............219/121 L |

OTHER PUBLICATIONS
Osial, T. A. Industrial Laser Applications In Instruments and Control Systems, pp. 101– 104, October 1967.

*Primary Examiner*—James M. Meister
*Attorney*—Chisholm and Spencer

[57] ABSTRACT

Non-contact thermal cutting is done reliably, yielding cut pieces of glass having edge strength never hitherto reliably achieved. A suitably delineated infrared source is positioned at one focus of an elliptical reflector means, thereby causing its energy to be concentrated at a focus locus that is caused to coincide with one surface of the piece of glass to be cut along an intended line of fracture, the infrared source being such as to generate in the piece of glass to be severed a stress of at least 725 grams per square millimeter.

10 Claims, 7 Drawing Figures

PATENTED OCT 3 1972
3,695,498
SHEET 1 OF 2
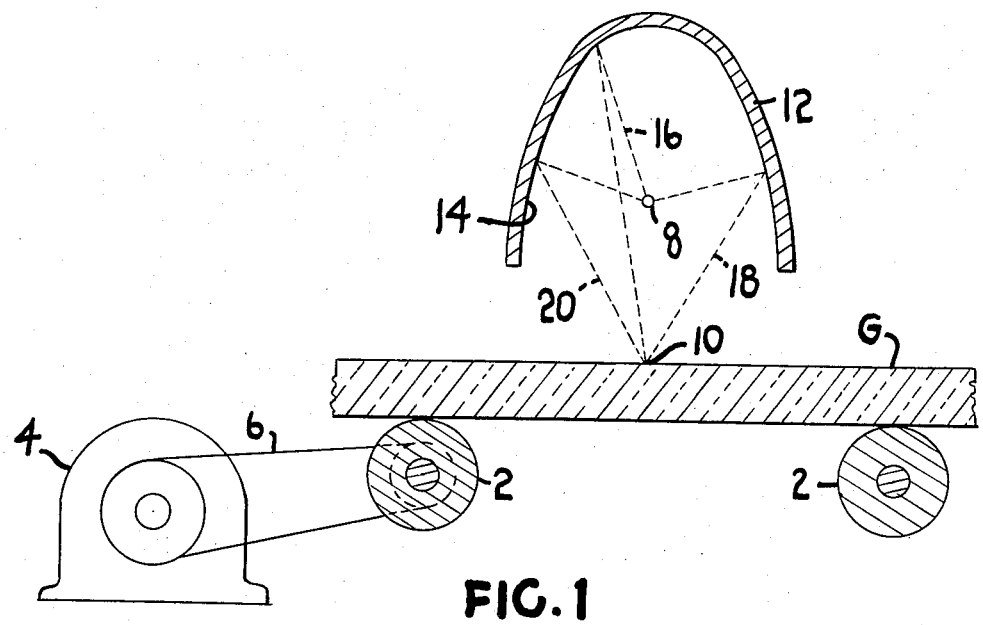
FIG. 1
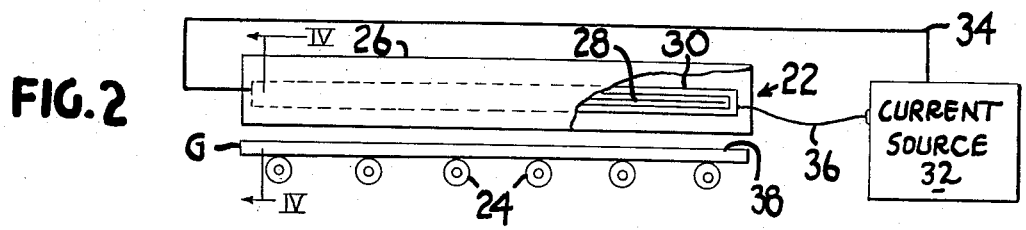
FIG. 2
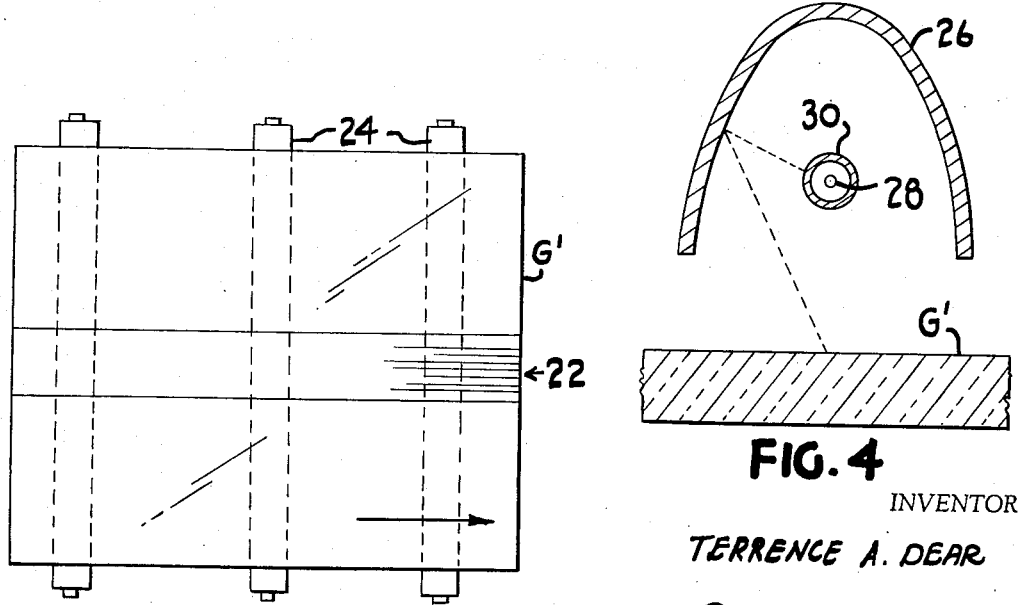
FIG. 3
FIG. 4
INVENTOR
TERRENCE A. DEAR
BY Chisholm and Spencer
ATTORNEYS

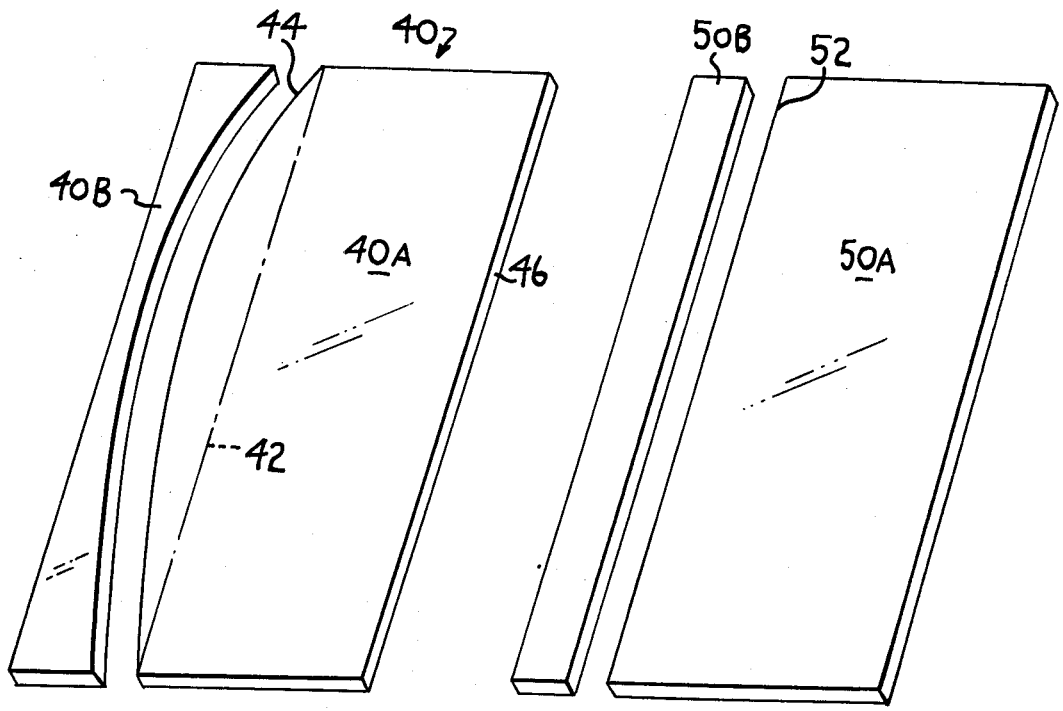
FIG. 5
FIG. 7
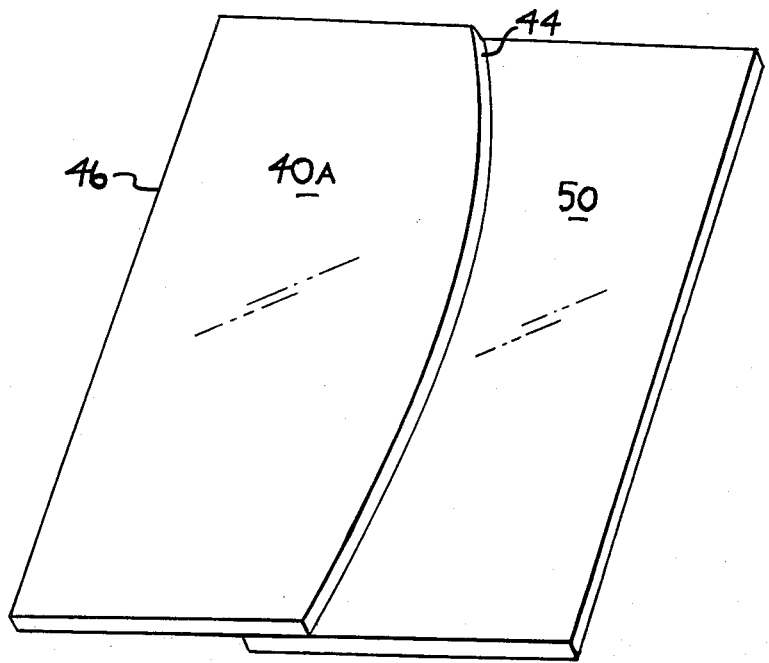
FIG. 6
INVENTOR
TERRENCE A. DEAR

NON-CONTACT THERMAL CUTTING

CROSS-REFERENCE TO RELATED APPLICATION

This application is a continuation-in-part of my copending application Ser. No. 708,952, filed Feb. 28, 1968, now abandoned.

BACKGROUND OF THE INVENTION

1. Field of the Invention

This invention relates to a method of thermally severing a piece of glass.

2. A Description of the Prior Art

The most pertinent prior art of which I am aware comprises Campbell et al. U. S. Pat. No. 1,720,883; Hitner U. S. Pat. No. 1,777,644; Spinasse U. S. Pat. No. 1,973,546; and Hafner U. S. Pat. No. 3,453,097.

The Campbell et al. patent discloses the severing of glass in accordance with a method comprising "bringing a hot object or objects or elements, heated electrically or other-wise, into contact with or into close proximity of the glass." It discloses, moreover, that: "In order to quickly initiate the severing action, a nick or fault or other weakened portion may be formed by the apparatus at a point on the glass at the line of cleavage where the severage action is to start."

The Hitner patent is said to disclose "an improved apparatus adapted to prevent the somewhat irregular line of fracture which has hitherto been characteristic of the severing of glass by the use of an electrically heated wire or ribbon." The Hitner patent uses an electrically heated wire for the non-contact severing of glass, but it teaches "providing means for giving a distribution of heat over a substantial area of glass on each side of the ribbon or wire," saying that, "as a result, the line of fracture is smooth and regular, approximating in these particulars the line of fracture secured by scoring the glass with a diamond or wheel."

The Spinasse patent teaches having "a tubular portion of metal or other suitable refractory material adapted to present a heating surface in close contact with or in close proximity to the body of the drawing sheet near the region where the same is to be cut to remove the border." It teaches further: "It will be obvious, therefore, that as the sheet of glass is drawn past the heating element the border of the glass is heated in a path parallel to and near the edge of the sheets so that if the glass could be cut or checked by means of a cold checking tool beyond the heated path, shown by the broken line in FIG. 2, the border can be easily removed without fracturing the body of the sheet." The patent further teaches that the "temperature of the heating element can be varied according to the thickness of the glass or the speed at which it is drawn past the heater but as a rule a cherry-red heat yields good results for the average sheet at the average speed of drawing."

The Hafner patent discloses a method of cutting glass "wherein the glass sheet is moved continuously past a continuous laser beam which is focused upon the glass sheet. The laser and absorptive characteristics and parameters are selected so that the glass absorbs the laser energy and converts it into sufficient heat to enable separation of the sheet into pieces along the line swept by the laser beam."

SUMMARY OF THE INVENTION

Non-contact thermal cutting is conducted by using a focused source of infrared energy having suitable power and delineation characteristics. The method yields reliably cut pieces of glass having edges of high quality, particularly in regard to their strength. Though possibly of some use with glass as thin as 1 millimeter in thickness, the method of the invention is of particular usefulness in the cutting of thick flat glass, such as over 5 millimeters in thickness.

DESCRIPTION OF THE DRAWINGS

A complete understanding of the invention may be obtained from the foregoing and following description thereof taken in conjunction with the appended drawings:

FIG. 1 is a schematic elevation view of equipment used in practicing the method of the instant invention, using a spot-heater source;

FIG. 2 is a schematic elevation view indicating the practice of the instant invention with the use of a line-heater source with the second part partly broken away for a better understanding and showing of the instant invention;

FIG. 3 is a plan view of the equipment shown in FIG. 2;

FIG. 4 is a partial sectional view taken on the line IV—IV of FIG. 2;

FIG. 5 is a perspective view of a piece of glass and a trim removed therefrom, said piece of glass having a "-banana edge;"

FIG. 6 is a perspective view of a piece of glass in FIG. 5 used as a template to sever a second piece of glass; and FIG. 7 is a perspective view of the second piece of glass after it has been severed.

DESCRIPTION OF THE PREFERRED EMBODIMENT

The non-contact thermal cutting of glass sheets has considerable commercial advantages, particularly with reference to sheets of glass having a thickness about 5 millimeters or more. The invention may be used, however, with respect to glass sheets having a thickness of 1 to 50 millimeters and possibly thicker.

The present invention is of especial use in connection with the severing of sheets that are greater than 5 millimeters in thickness because when mechanical scoring means have been used in connection with the above, there has hitherto been difficulty in obtaining a cut edge of satisfactory appearance, high edge strength, and other characteristics. It has been particularly difficult to obtain, in cutting a piece of glass that thick, an edge that is suitable for further use without a further grinding or polishing operation. Moreover, the strength of the cut edge, when determined as hereafter described, usually does not exceed 2,900 grams per square millimeter and is frequently considerably less than that, whereas it is frequently desired that, especially without such grinding and polishing, the cut edges exhibit better edge-strength values. The thermal cutting of glass by means taught herein produces edges of pristine appearance and high strength.

The ability of a sheet of glass to be non-contact thermally severed in accordance with the present invention is dependent in large measure upon the ability of the glass to absorb suitable infrared radiation selectively through its thickness and so create the thermal gradient required to produce the severing stress. In this regard, much depends upon the ability of the glass to absorb electromagnetic radiation in the range of the near infrared, particularly with a peak wavelength of about 8,500 to 11,500 Angstroms (0.85 to 1.15 microns). This, in turn, is dependent to some extent upon the transition-element content of the glass involved. The transition elements are iron, cobalt and nickel, and it is usual for one of these elements, especially iron, to be present in glass to at least some small extent, on the order of about 0.12 per cent $Fe_2O_3$, at least in the sheet-glass pieces of commerce. The use, in accordance with the invention, of a thermal source that emits substantial quantities of electromagnetic radiation at a somewhat higher wavelength, in the event that the glass to be thermally severed is noticeably free of transition elements, is not to be ruled out. In most of the glass of commerce, however, the element iron is present as aforesaid in about the amount hereinabove mentioned, and this tends to make a piece of sheet glass produced in accordance with methods now commercially utilized amenable to a thermal-severing process wherein the electromagnetic radiation used is one having a wavelength as indicated hereinabove.

In accordance with the present invention, several things are required. First, it is required that the source used be one that has satisfactory delineation, considering as another very important factor the potency of the thermal source employed. If the thermal source is a spot source, the source should not be more than 6.35 millimeters in diameter. With a source larger than that, difficulty is experienced in attempting to concentrate or focus upon a particular area in the surface of the glass the required and relatively large flux of radiation that is required to generate the desired fracture. This applies with a thermal source of modest and reasonable strength. If the source is less delineated, it must be stronger in order to produce the thermal stress necessary to rupture the glass.

It is essential, in accordance with the present invention, not only that the source used be so delineated as indicated above but also that there be provided a suitable elliptical heat-reflecting means in operative association with the thermal source. The thermal source is to be placed at one of the foci of an ellipse, such that the other focus of the ellipse forms a focus locus that is substantially coincident with a surface of the sheet that is to be cut and substantially coincident with the line of cut that is to be effected thereon. Even a relatively minor inaccuracy in the alignment of the focus locus with the surface of the glass sheet to be cut may have relatively serious consequences as respects the efficiency of the cutting operation. For example, taking the cutting of a piece of glass 3 millimeters in thickness, a misalignment in the focus locus of more than 0.03 inch or 0.75 millimeter in the positioning of the sheet with respect to the focus locus may result in a decrease, in the amount of thermal energy absorbed by the glass sheet, of at least as much as 20—25 per cent.

If the thermal source is a spot heater, the focus locus is substantially a point or a small sphere; on the other hand, if the thermal source is a line heater, the focus locus comprises a cylindrical line.

It is considered to be within the scope of the present invention to provide means whereby a relative motion is effected between the glass that is to be cut and the thermal source. On the other hand, the present invention can also be used while both the glass and the thermal source remain completely stationary.

It is important that the amount of radiation that is incident upon the zone containing the intended line of fracture propagation be such as to generate in the glass a stress of at least 725 grams per square millimeter, this being the stress that is required to cause fracture of the glass along the intended line of cut. Beyond that, little is required to achieve the results disclosed and claimed herein, except that it is necessary to avoid the use of a power source of such location and nature as to cause melting or crazing of the glass. It is believed that in this regard the patent to Hafner (laser-beam cutting) is distinguishable from anything that the Applicant's assignee has hitherto tried and found to be of substantial usefulness. A thermal-cutting method that causes melting of the glass at the top surface along the line of cut gives lower edge-strength values than are obtained when the present invention is practiced. Moreover, in the laser cutting of glass it is common to encounter crazing, which is characterized by the development of a large number of very small fractures along the locally heated line. The strength of a crazed edge is even lower than that of a melted edge.

Thermal cutting in accordance with the present invention is such that it is substantially always required that electromagnetic radiation be supplied to the piece of glass that is being cut under such conditions that the piece of glass to be cut absorbs the energy at a rate of at least about 0.155 watts per square millimeter in the zone of intended cut. Usually, the energy flux in the zone of intended cut is at least 0.62 watts per square millimeter, and desirably it is usually on the order of 1.24 watts per square millimeter or higher. It is not so high, however, as to cause incipient melting of the glass (which detracts from the edge strength and quality of the cut pieces). The level of energy to be used is dependent upon a number of factors, including the thickness of the glass, the iron or other transition-metal content of the glass, and the nature of the process employed, i.e., whether the piece to be cut is stationary or moving. If the piece to be cut is stationary, the level of thermal energy supplied to the glass will have an influence upon the amount of time required to cause the fracture to form and develop. If the glass to be cut is moving, the level of thermal energy supplied to the glass has an influence upon the line speed that is to be used in the non-contact thermal-cutting operation.

Distinct advantages are obtained by conducting the cutting in the non-contact manner herein taught. In general, when the cutting is done in the manner taught in accordance with this invention, the edge strength of the cut piece is generally about at least twice that of a piece cut in accordance with prior-art methods such as hand-scoring and snapping. To be more specific, a considerable improvement is observed in a test in which glass specimens 650.4 millimeters long by 101.6 millimeters wide are set on edge and tested in a beam-loading test, with the support members positioned 548.8 millimeters apart and the load members (above the specimen) being 254 millimeters apart and equidistant from the middle of the specimen, with a load then being applied to the load members centrally of the specimen at a rate of a thousand pounds per minute. The best statically handled, mechanically scored and snapped specimens fail in such a test at about 3,625 to 4,350 grams per square millimeter, but edges produced in accordance with non-contact thermal cutting conducted in accordance with this invention fail at about 11,000 to 14,500 grams per square millimeter. Similarly, specimens of flat glass that have been dynamically mechanically scored and snapped ordinarily exhibit in this test values such as 1,087 to 2,900 grams per square millimeter, whereas specimens of glass that have, while moving, been edge-cut in accordance with the principles of this invention exhibit in the same test an edge strength on the order of 4,350 to 7,250 grams per square millimeter. The above-indicated increase in edge strength is not merely of academic interest, since the edge strength is related to the observed incidence of breakage during any subsequent handling of the edge-cut sheet of glass involved.

Referring now to FIG. 1, there is shown a piece of glass G that is being moved by means of a roll 2 driven by a motor 4, to which it is operatively connected as indicated at 6, in a direction perpendicular to the plane of the drawing. The drawing shows schematically a source 8 of thermal energy, preferably one such that it has a substantial output of radiation in the range of 8,500 to 11,500 Angstroms wavelength, and necessarily such that it is capable of producing at the spot or locus 10 electromagnetic thermal radiations such that the quantity thereof that is absorbed by the glass at the various different distances within it beneath the surface to which the heat is applied is great enough to produce therein, considering the initial stress pattern of the glass taken throughout its thickness, a stress in tension of at least 725 grams per square millimeter. Source 8 may be, for example, a spot source having a diameter of at most 6.35 millimeters being a wire or filament supplied with a suitable electrical power by means not shown, or the source 8 may be considered as comprising a line heater such as a helical coil 1.27 to 1.78 millimeters in diameter made of tungsten wire about 0.152 millimeter in diameter and encased in a quartz tube filled with argon or other inert gas, this line heater similarly being supplied with a suitable quantity of suitable electrical power. In any event, the source 8 is such as to provide at the focus locus 10 a suitably delineated image not wider than approximately 6.35 millimeters for a spot heater, and in the case of a line heater, about half of that.

As an essential feature of the invention, there is provided an elliptically shaped hood 12, that is, interiorly thereof, a highly polished and reflective surface 14. As can be seen, the surface 14 is such that radiation emanating from the source 8, as is indicated by the lines 16, 18 and 20, is reflected and focused at the focus locus 10. To obtain this result, it is essential that source 8 be located substantially at one of the foci of the ellipse that is generated by completing the surface 14, with the focus locus 10 forming the other focus of said ellipse. In the event that the source 8 is considered as constituting only a spot, the surface 14 constitutes a frustum of an ellipsoid of appropriate shape. If the source 8 comprises a line, the shape of the reflecting surface 14 is such that in proceeding along that line and taking any of the planes passing through that line and perpendicular to it, the intersection of that plane with the surface 14 is such as to define an ellipse having one focus at 8 and another focus at 10, with the focus at 10 being aligned with the surface of the sheet of glass G to be cut.

When thermal cutting is done upon a moving piece of glass substantially in accordance with the diagram explained above, there is a certain maximum of speed of traverse at which the glass G may move while still bringing about the desired cut, and this is dependent not only upon the thickness of the glass but also upon its transition-element content and upon the flux density of the source 8. The diameter of the filament of the source 8 controls the flux density, since a reflector cannot produce at a focus an image smaller than the diameter of the filament. In general, however, it can be said that, considering soda-lime glass of usual iron content and considering the use of a source capable of putting into the glass energy at the various rates indicated in the table hereinbelow, the traverse speed of the glass should not exceed the rates indicated hereinbelow.

| Thickness, mm. | Traverse speed, mm./min. per 1,000 watts of input energy |
| --- | --- |
| 3.17 | 225 |
| 6.35 | 112 |
| 12.70 | 56 |

For example, for an input energy of 6,800 watts, the above rates of traverse become

| Thickness, mm. | Traverse speed, cm./min. |
| --- | --- |
| 3.17 | 153.4 |
| 6.35 | 76.5 |
| 12.70 | 38.2 |

Referring now to FIGS. 2—4, there is shown another embodiment of the invention in accordance with which a piece of glass G' is subjected to the action of a line heater, indicated generally at 22. The glass G' is supported on suitable members 24, and there is positioned above it line heater 22, comprising a shield or reflector 26 that is of elliptical shape, as generally indicated hereinabove, with there being positioned within the shield 26 and substantially in a line coincident with an upper one of the foci of the family of ellipses determined by the intersection between the interior surface of the reflector 26 and a family of planes, each of them perpendicular to the intended line of cut, a suitable thermal source, such as a filament 28 of tungsten wire 0.152 millimeter in diameter wound in a coil of 1.589 millimeters in diameter and encased in an envelope 30 of quartz or like material that is substantially transparent to the infrared radiation emanating from the filament, the envelope 30 being filled with a suitable inert gas such as argon. The filament 28 is connected at its ends to a current source 32 by means of wires 34 and 36. The geometry of the arrangement of FIGS. 2—4 is such that the intended line of cut in the glass G' intersects with the upper surface 38 of the glass G' in a line that is at the other one of the foci of the family of ellipses mentioned above, the one other than the family of foci occupied by the filament 28.

The spacing of the foci is determined by the shape of the ellipse selected, and it is ordinarily such that the foci are about 50.8 to 101.6 or more millimeters apart. Achieving accurate focusing upon the upper surface of the glass G' along the upper surface of intended line of cut is important, the allowable deviation being on the order of 1.589 millimeters. If desired or necessary, means (not shown) are provided to adjust the distance between the source and the top surface of the glass, particularly if means are not provided for permitting the assembly containing the source and reflector to rest upon the top surface of the glass. If such means are provided i.e., legs of suitable length, it will not matter if the thickness of the glass to be cut varies somewhat, since with the use of legs of suitable length, proper alignment of the focus locus with the line on the top surface of the glass corresponding to the intended line of cut will be assured, regardless of variations and the thickness of the glass to be cut.

The amount of power to be used is dependent upon the thickness of the glass to be cut, the amount of time to be allowed for the completion of the cut, whether or not there is used an edge nick and possibly other factors such as the purposeful application of a bending moment or the purposeful development of a field of stress by other thermal means along the intended line of cut. Under static conditions, cutting a slab of glass 610 millimeters by 610 millimeters, supported symmetrically with respect to the line of cut as shown in FIG. 3, and using a source such that the power radiated to the focus locus is 59 watts per lineal centimeter, and using an edge nick, the time required for the completion of the thermal severing varies in accordance with the thickness of the glass as follows: for 25.4 millimeters thick, 30 seconds; for 18 millimeters thick, 14 seconds; for 13 millimeters thick, 12 seconds; for 6.5 millimeters thick, 6 seconds; and for 3.7 millimeters thick, 4 seconds. With a power of 69 watts per lineal centimeter, glass 31.7 millimeters thick may be severed under the same conditions in 35 seconds. At higher levels of flux density (power per unit area of energy concentrated at the incident focus), less time is required.

Results similar to those indicated above may be obtained by using as a source a lamp having a lighted length of 635 millimeters and a rated voltage of 600 volts, operated at a rated current 8.33 amps. When the above conditions are used it is advisable that the reflector 22 be water-cooled, e.g., with the use of a flow of 1.892 liters per minute. The same lamp may, of course, be operated at above its rated power; for example, when operated at 1,200 volts, a similar lamp may develop 14.2 kilowatts of power and produce at the focus a heat flux of 172 watts per lineal centimeter. As the voltage applied to the filament increases, the frequency of its emitted infrared energy shifts to a somewhat shorter wavelength, i.e., from a peak of 11,000 Angstroms at rated voltage to 8,500 Angstroms at twice rated voltage.

The breaking (fracturing) of glass as the result of producing thermal gradients that produce local stresses sufficient to propagate fractures is certainly not new; this occurs unwanted in the making of window glass. In fact, prior to the present invention, several attempts have been made to cause the fracturing of glass along an intended line of cut by the purposeful application of heat to a locus corresponding thereto. Prior to the present invention, however, not much success has been achieved in causing the intended line of cut to follow its intended path, and this may be traced, to a considerable extent, to a failure to appreciate certain salient factors involved, such as not only the thermal source used (its power, the degree of concentration or focusing achieved, and its wavelength) but also the need for providing in the vicinity of the intended line of cut of an appropriate uniform (or controlled non-uniform) field of forces. If, for example, an attempt is made to produce a non-bisecting cut on a piece of glass 610 millimeters by 610 millimeters by 25.4 millimeters thick, the cut that is obtained may be bowed or curved, rather than running straight. This is usually unacceptable in a commercial product.

The above described process has been practiced satisfactorily in cross-cutting and in making bisecting longitudinal cuts. When attempts were made to produce non-bisecting longitudinal cuts, the edge obtained was usually bowed or curved (herein referred to as a "banana" edge) rather than straight. This is usually unacceptable in a commercial product. In accordance with a further embodiment of the instant invention, a straight, non-bisecting cut in a piece of glass is produced by applying a thermal source as indicated above along a straight-line locus to a piece that will later be used as a template.

Referring to FIGS. 5—7, there is illustrated diagrammatically the steps of this further embodiment. FIG. 5 shows a piece of glass 40 that has been severed into piece 40A and trim 40B either by thermal cutting or by thermal scoring and mechanical snapping. Piece 40 was heated along an intended line of cut 42, but as pointed out above, in non-bisecting cuts, a "banana" edge 44 results. Piece 40A is then rotated about edge 46 and placed on a second piece of glass 50, as shown in FIG. 6. Piece 40A is thereby used as a template to lay out, upon the piece of glass 50, a path that is bowed toward the center of piece 50, rather than toward the edge as a normal "banana" edge. Heat is then applied to the second piece of glass 50 either by a spot-type thermal source that travels along the path defined by "banana" edge 44 or by a suitably curved line-type thermal source, causing piece 50 to be thermally severed. In effect, piece of glass 50 has been heated along a path that is opposite to the normal "banana" edge. As shown in FIG. 7, piece 50 is severed into a piece 50A and a trim 50B. In this case, however, a piece is produced having a straight edge 52, since the effect of the template with an opposite "banana" edge cancels out the would-be effect of the "banana" edge on the piece of glass 50.

It will be appreciated from the foregoing that the focus locus is not always necessarily coincident with the intended line of cut (although this is usually the case). It can be said, however, that the focus locus is always located, according to the invention, in accordance with a predetermined line of cut along which the piece of glass is to be severed.

Either a spot-type or a line-type heater may be used, traveling in relative motion with respect to the glass. In the event that a rectilinear line-type heater is used, the relative motion is such that the projection of the heater upon the glass is substantially rectilinear.

I claim as my Invention:

1. A method of cutting a sheetlike piece of glass, said method comprising the steps of positioning with respect to said glass an elliptical reflector means having a first focus and a second focus spaced from said first focus, providing at said first focus a source of thermal energy having a maximum dimension in a direction transverse to the intended line of cut of 6.35 millimeters, said source of thermal energy comprising a wire or filament capable of being provided with electrical power in such amount as to generate in the glass a stress of at least 725 grams per square millimeter, and supplying electrical power to said wire or filament to cause the production of infrared radiation and its reflection and focusing into a locus at said second focus, said locus being coincident with the surface of said piece of glass that is adjacent to said source, and said locus further being located in accordance with a predetermined line of cut along which said piece of glass is to be severed.

2. A method as defined in claim 1, characterized in that said glass is ordinary soda-lime glass and the source of thermal energy units predominantly infrared radiation having a wavelength of 8,500 to 11,500 Angstroms.

3. A method as defined in claim 1, characterized in that said piece of glass is about 5 millimeters or more in thickness.

4. A method as defined in claim 1, characterized in that said source of thermal energy comprises a line-type heater comprising a coil of tungsten wire, said coil being about 1.59 millimeters in diameter and the wire of said coil having a diameter of about 0.152 millimeter, said wire being enveloped in inert gas and provided with electric power.

5. A method as defined in claim 1, characterized in that said source of thermal energy comprises a spot-type heater, said method being conducted by causing said spot-type heater to be brought into relative motion with respect to said piece of glass to be cut while spaced at a uniform distance therefrom.

6. A method as defined in claim 1, characterized in that said source of thermal energy comprises a line-type heater, said method being conducted by causing said line-type heater to be brought into relative motion with respect to said piece of glass to be cut while spaced at a uniform distance therefrom, said relative motion being such that the projection of said line-type heater upon said glass is substantially rectilinear.

7. A method of severing a first piece of glass along a straight line of predetermined location, said method comprising the steps of applying to a second piece of glass congruent to said first piece of glass a heat source along a straight line having a location corresponding to said predetermined straight line, whereby there is produced in said second piece of glass a thermal fracture following a curved line, and then applying to said first piece of glass thermal energy along a curved line congruent to said curved line, whereby said first piece of glass is severed in a straight line of said predetermined location.

8. A method as defined in claim 1 wherein said elliptical reflector is positioned with respect to glass containing at least one of the transition elements.

9. A method as defined in claim 1 wherein said elliptical reflector is positioned with respect to glass having about 0.12 percent $Fe_2O_3$.

10. A method of cutting glass along an intended path of cut comprising the steps of:

establishing a source of radiant energy adjacent to a surface of said glass and along the intended path of cut, activating said source to generate radiant energy therefrom, focusing said radiant energy from said source to direct said energy onto a zone on the surface of said glass overlying the intended path of cut, and directing said focused radiant energy onto said zone until a thermal gradient is produced in said glass which establishes stresses therein sufficient to propagate a fracture along said intended path of cut.

* * * * *

UNITED STATES PATENT OFFICE
CERTIFICATE OF CORRECTION

Patent No. 3,695,498     Dated October 3, 1972

Inventor(s) Terrence A. Dear

It is certified that error appears in the above-identified patent and that said Letters Patent are hereby corrected as shown below:

Column 9, line 31, "units" should read ---emits---.

Signed and sealed this 22nd day of May 1973.

(SEAL)
Attest:

EDWARD M. FLETCHER, JR.
Attesting Officer

ROBERT GOTTSCHALK
Commissioner of Patents